March 25, 1969  J. M. MORRIS  3,434,586
VIBRATION GENERATOR CONTROLS
Filed Oct. 17, 1966

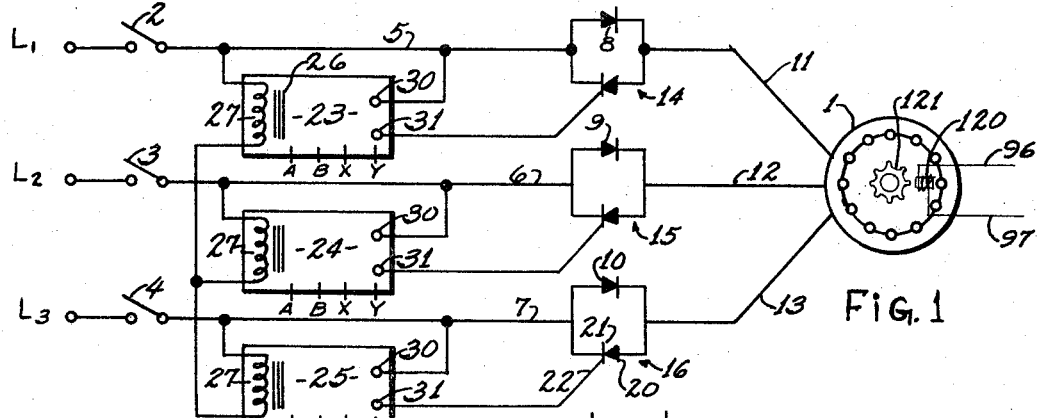
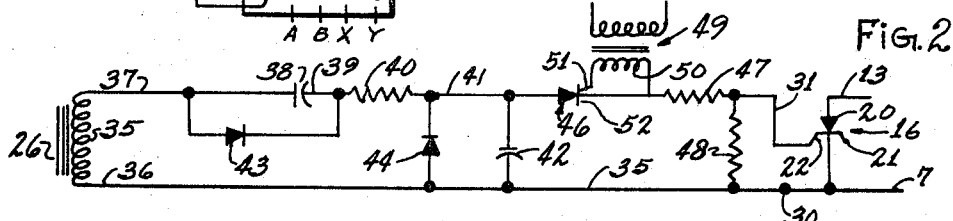
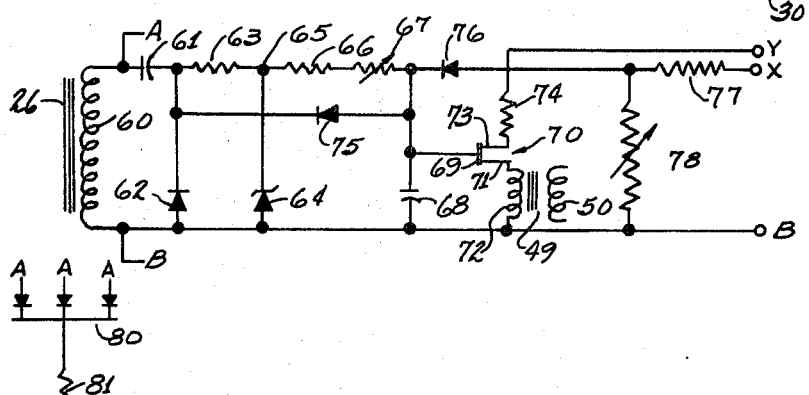
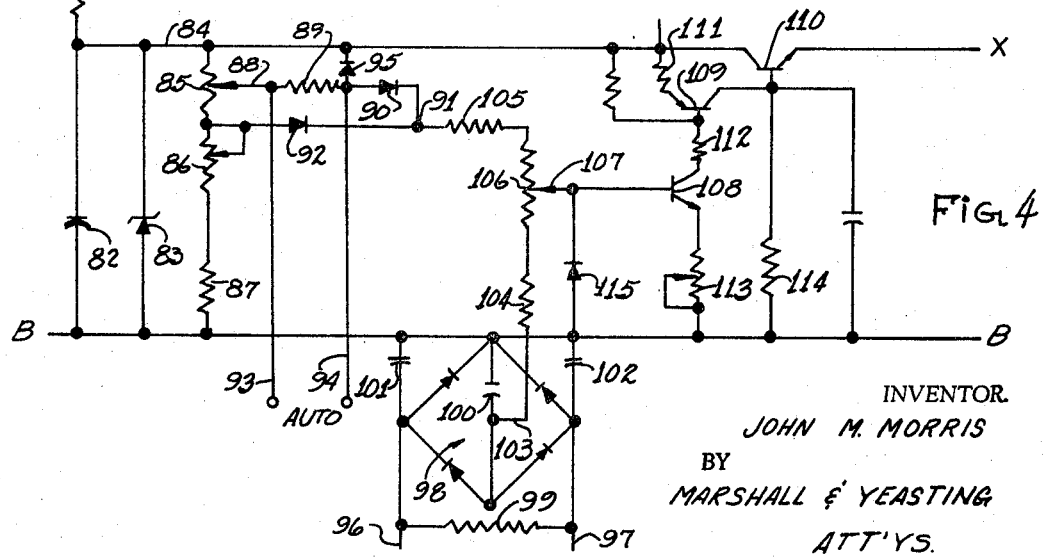
FIG. 1
FIG. 2
FIG. 3
FIG. 4
INVENTOR.
JOHN M. MORRIS
BY
MARSHALL & YEASTING
ATT'YS.

INVENTOR.
JOHN M. MORRIS
BY
MARSHALL & YEASTING
ATT'YS.

United States Patent Office 3,434,586
Patented Mar. 25, 1969

3,434,586
VIBRATION GENERATOR CONTROLS
John M. Morris, Louisville, Ky., assignor to Rex Chainbelt Inc., Milwaukee, Wis., a corporation of Wisconsin
Filed Oct. 17, 1966, Ser. No. 587,294
Int. Cl. B65g 27/20, 27/32
U.S. Cl. 198—220                                               6 Claims

ABSTRACT OF THE DISCLOSURE

A controlled rate vibratory feeder is provided in which the speed of an induction motor driving eccentric weights of the feeder is controlled by varying the voltage or current supplied to the motor according to the difference between a fixed or a process signal and a signal dependent on the speed of the motor.

---

This invention relates to apparatus including feeders and conveyors and in particular to means for controlling the frequency or speed of operation of a vibration generator included in and driving the apparatus.

It is desirable in many types of vibratory apparatus to be able to vary the frequency alone or vary the frequency and intensity of the vibration. This may include varying the feed rate of a feeder or conveyor, the agitation of a sieve or reactor tank, or any apparatus in which vibration is essential to the operation. The control of the feed rate of a vibratory feeder is necessary in many applications. In fact, in some cases, the feed rate must be adjustable from full on to off.

As an example, in the field of feeding materials, it has been customary to employ electromagnetically driven tuned vibratory feeders when a wide range of feed rates are required because of the ease with which the feed rate may be varied by merely regulating the amplitude of the voltage applied to the electromagnetic coils driving the vibrator. This control has been effected by means of rheostats included in series with the vibratory coils or by variable ratio transformers or similar equipment. Electromagnetically driven vibrators are subject to the disadvantage that they must operate at line frequency, i.e. 3600 cycles per minute on a 60 cycle per second supply frequency if the rectifiers are used in the control circuit or at twice that frequency if the rectifiers are omitted. At these high frequencies of operation the available stroke is very short and many materials, because of their elastic characteristics, will feed only when admitted to the conveyor deck in a very thin layer. It has been observed that better conveying action occurs if the vibratory feeder is operated at a lower frequency, in the order of 400 to 900 cycles per minute and at a correspondingly longer stroke. For example, an electromagnetic feeder may operate at a 1/32 inch stroke (1/64 inch amplitude) for best feeding action while a low frequency feeder operates at an amplitude in the order of 3/16 to 1/4 inch at 900 cycles per minute or four times that amplitude if the speed is reduced to the order of 450 cycles per minute. At these longer strokes the resiliency of the material does not adversely affect the feeding of the material.

Electromagnetic vibrator drives are unsatisfactory for low frequency operation, both because of the expense of providing the frequency changing equipment to supply the required low frequency alternating current power and also because of the relatively inefficient operation because of the longer air gaps required in the magnets. It has therefore been customary to employ rotating eccentric weights for operation at the lower frequencies.

Heretofore low frequency variable rate vibratory apparatus, employing eccentric weights, has been constructed with variable rate springs so that the tuning of the vibratory system could be varied to vary the response of the apparatus to the constant excitation of the eccentric weights. Such a system is illustrated in U.S. Patent No. 2,984,339 issued to Albert Musschoot on May 16, 1961. This patent discloses the use of air springs employed in a constant excitation tuned vibratory system in which the inflation pressure of the air springs is varied to change the tuning and hence the amplitude of vibration. Systems employing the air springs have the minor disadvantage that a source of air under pressure is required in addition to the electrical power for driving the eccentrically loaded motor.

The principal object of this invention is to provide an improved and simplified method for controlling the intensity of vibration of an eccentric weight driven vibratory apparatus by control of its operating frequency.

Another object of the invention is to provide an eccentric weight vibration generator for use with vibratory apparatus such as feeders in which the generator is operated over a wide speed range to vary the amplitude of the acceleration forces delivered by the generator, the required speed being obtained by continuously varying the power supplied to an induction motor driving the generator as necessary to maintain the required speed.

Another object of the invention is to provide a vibratory feeder employing an induction motor driving unbalanced weights and control means for varying the power applied to the induction motor and thereby varying its speed to vary the delivery rate of the feeder.

More specific objects and advantages are apparent from the following description of a preferred form of the invention.

According to the invention, the speed of rotation of an induction motor carrying eccentric weights is controlled by continuously varying constant frequency electrical power applied to the motor to maintain the speed of the motor at the speed producing the required frequency of vibration of a system being vibrated. The required frequency may be the resonant frequency of the system if maximum vibratory response is required, or it may be a frequency related to the resonant frequency if lesser response is desired. It may also be a selected speed in a non-resonant system at which the acceleration of a work member of the system has a desired value.

Preferred forms of the invention are illustrated in the accompanying drawings. In the drawings:

FIG. 1 is a schematic diagram of a motor control circuit for driving an induction motor of a vibratory system at a preselected speed.

FIG. 2 is a detail diagram of a portion of the control circuit shown in FIG. 1.

FIG. 3 is a detail diagram of another portion of the control circuit shown in FIG. 1.

FIG. 4 is a wiring diagram of an amplifier employed to compare an electrical signal corresponding to the speed of the motor of FIG. 1 with suitable command signals to control the flow of power to the motor.

Figure 5:
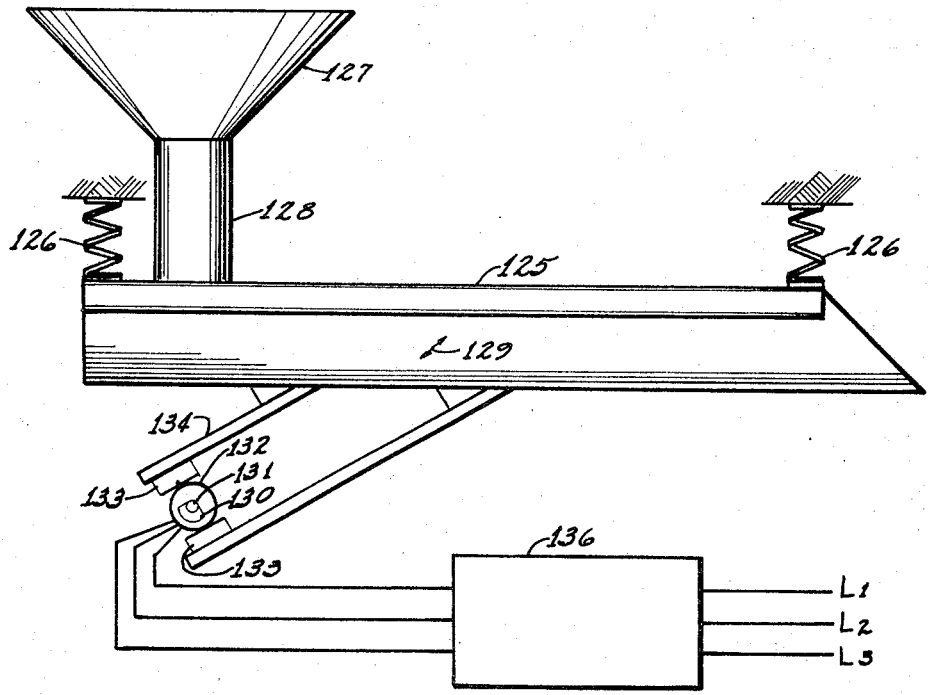
FIG. 5 is a schematic diagram of a vibratory feeder driven by an A.C. induction motor according to the invention.

These specific figures and the accompanying description are intended merely to illustrate the invention and not to impose limitations on its scope.

The improved control system combines a number of features to provide an economical vibration generator system adaptable to a number of uses.

For purposes of illustration and explanation the preferred control circuits are first discussed in detail and then their application to the generator of a vibratory system.

In FIG. 1 a three phase induction motor 1 is illustrated as being energized from a three phase power line comprising leads L1, L2 and L3. In this arrangement power from the power line is fed through switches 2, 3 and 4 of a customary disconnect switch, which may include fuses or circuit breakers, through leads 5, 6 and 7 and rectifier cells 8, 9 and 10 conected throungh leads 11, 12 and 13 to the motor 1. The rectifier cells 8, 9 and 10 are connected to feed current in the conventional sense from leads L1, L2 and L3 to the motor 1. Return current from the motor is fed to the power line through silicon controlled rectifiers 14, 15 and 16 connected respectively in parallel with and oppositely poled to the rectifier cells 8, 9 and 10. The circuit as shown controls the current flow from the motor 1. The circuit is equally effiective for controlling the current flow if the rectifier cells 8, 9 or 10 are interchanged with the corresponding silicon controlled rectifiers 14, 15 and 16 in which case the control rectifier would control the flow of current from the lines to the motor while the rectifier cells would freely pass the return current from the motor back to the line.

Each of the silicon controlled rectifiers, such as the rectifier 16, comprises an anode 20, a cathode electrode 21 and a gate electrode 22.

Each of the silicon controlled rectifiers 14, 15 and 16 is individually controlled by controls 23, 24 and 25 of FIG. 1 the details of which are shown in FIGS. 2 and 3. Each of these controls includes a power transformer 26 having a primary winding 27 which primary windings are connected in Y across the leads 5, 6 and 7 carrying the three phase power. Each of the controls 23, 24 and 25 has output terminals 30 and 31 one of which is connected to the power lead leading to the cathode of the controlled rectifier and the other of which is connected to the gate electrode of the rectifier. As shown in FIG. 1 the cathodes of the controlled rectifiers are connected to the power leads 5, 6 and 7. If the diodes 8, 9 or 10 are interchanged with the controlled rectifiers the output leads from the control circuits must still be connected between the cathodes of the controlled rectifiers and the gate electrodes regardless of whether the cathodes are connected to the leads 5, 6 and 7 or to the leads 11, 12 and 13.

FIG. 2 shows a preferred circuit for supplying control power for each of the silicon controlled rectifiers 14, 15 or 16 of FIG. 1. This circuit comprises a secondary winding 35 having leads 36 and 37. Lead 36 is connected directly to output terminal 30 and hence to the cathode electrode 21 of the silicon controlled rectifier to be controlled. Lead 37 is connected to a first terminal of a condenser 38 which is connected through a lead 39, a resistor 40, a lead 41, and a second condenser 42 connected to the return lead 36. A pair of rectifiers 43, 44 are also provided, the rectifier 43 being connected in parallel with the first condenser 38 and the rectifier 44 being connected in parallel with the second condenser 42. The rectifier 43 is arranged to pass current when the lead 37 is positive while the rectifier 44 is reversed so as to pass current when lead 37 is negative with respect to lead 36. The circuit can also be arranged with the rectifier 44 connected between the lead 36 and lead 39. This latter connection excludes the resistor 40 from the charging circuit of condenser 38. The illustrated arrangement is preferred because of the current limiting effect of the resistor 40 during the charging cycle.

The lead 41 is further connected through a controlled discharge device, preferably a small silicon controlled rectifier 46, and current limiting resistor 47 to the output terminal 31 connected to the gate electrode 22 of the rectifier to be controlled. A biasing resistor 48 connected between the output terminals 31 and 30 tends to hold these terminals at the same potential.

Signal current for triggering the small silicon controlled rectifier 46 into conduction is provided through a pulse transformer 49 having a secondary winding 50 connected between a gate electrode 51 and cathode 52 of the small controlled rectifier 46.

The transformer secondary winding 35 is connected so that the voltage on its lead 37 is in phase with the voltage on the anode of the silicon controlled rectifier to be controlled by this circuit. When so arranged the condenser 38 is charged during the half cycle of the alternating power when the lead 37 is negative with respect to lead 36. During this time the lead 41 is held at substantially the potential of the lead 36 or 30 (these being connected together) by current flow through the rectifier 44. As the voltage on the lead 37 becomes positive going, after its most negative maximum, a part of the charge accumulated on the condenser 38 is transferred through the resistor 40 to charge the condenser 42. Thus, by the time voltage on the anode of the controlled rectifier 16 approaches or becomes positive with respect to the cathode 21, in the positive going direction, the condenser 42 is charged to a substantial potential. At this point there is no current flow through the small controlled rectifier 46 to energize the gate electrode of the rectifier 16.

To initiate conduction in the rectifier 16 a voltage pulse is transmitted through the pulse transformer 49 to trigger the small controlled rectifier 46 into conduction thereby, in effect, connecting the condenser 42 through the current limiting resistor 47 across the terminals 31 and 30 connected respectively to the gate and cathode of the rectifier 16. The condenser 42 then discharges through this path supplying a gate current for the rectifier 16 limited only by the current limiting resistor 47. Preferably the current limiting resistor 47 has a value in the order of 10 ohms and the condenser 42 is charged to approximately 10 volts so that the initial current surge through the gate electrode of the rectifier 16 is in the order of an ampere. This high current flow lasts less than a microsecond depending upon the capacitance of the condenser 42. For a medium power rectifier, the condenser 42 may have a value of two tenths of a microfarad so that this condenser is substantially discharged through the gate circuit in approximately a half of a microsecond. This provides the initial pulse of current for positively driving the controlled rectifier 16 into conduction. However, with inductive loading, anode current cannot build up to a sustaining value in this short time interval. The circuit meets this problem by providing that current may also flow from the condenser 38 through the current limiting resistor 40 and the resistor 47 so as to discharge the condenser 38 into the gate electrode circuit of the rectifier 16 at a slower rate. Preferably the condenser 38 has a value in the order of 10 microfarads and the resistor 40 a value of approximately 150 ohms thus giving a time constant in the order of one and one half milliseconds which is thus able to supply current at a sufficient level to maintain conduction for two or three milliseconds of time. The current flow during this interval is limited primarily by the resistor 40 to a value well within the continuous current rating of the gate circuit of the rectifier.

When the lead 37 of the winding 35 goes positive with respect to lead 36 on the positive half cycle current may also flow through the rectifier 43 and resistor 40 to supplement the current from the condensers and maintain current flow through the gate circuit of the rectifier 16. for the balance of the positive half cycle of supply voltage.

This circuit thus provides energy storage means for supplying an initial high current surge to initiate conduction in the controlled rectifier, a further current flow at a reduced level from a source of stored energy for maintaining conduction in the controlled rectifier and, finally, means including the transformer secondary for continuing the flow of current throughout the remainder of the positive half cycle of the supply voltage.

FIG. 3 illustrates a timing circuit suitable for energizing the pulse transformer 49 and thus triggering the small controlled rectifier 46. This particular circuit provides that the timing of the pulse relative to the alternating current power may be continuously varied by means of an applied direct current signal voltage. As illustrated, this circuit is supplied with power from a secondary winding 60 of the transformer 26 having output terminals A and B. A condenser 61 and diode rectifier 62 are connected in series across the secondary winding terminals A and B, the rectifier 62 being arranged so that the condenser 61 is charged through the rectifier when the anode voltage of the rectifier to be controlled is negative. As the potential of the lead A rises from its most negative excursion value current flows from the condenser 61 through a resistor 63 and, as soon as the voltage is high enough, through a breakdown or Zener diode 64 to establish a postive regulated voltage at junction 65 between the resistor and the diode. The voltage at the junction 65 produces current flow through the resistor 66 and an adjustable resistor 67 in a direction to charge a timing condenser 68 connected between an emitter 69 of a unijunction transistor 70 and return lead B. The unijunction transistor 70 has a base 71 connected to the return lead B through a primary winding 72 of the pulse transformer 49. Its other base 73 is connected through a resistor 74 to a source of constant positive potential by way of terminal Y. The unijunction transistor 70 has the property that it is essentailly a high resistance circuit between its bases 73 and 71 until its emitter rises to a specified potential, approximately one half, of the potential between the bases as the condenser 68 is charged through the resistors 66 and 67. When the critical potential is reached the unijunction transistor 70 becomes conducting and discharges the condenser 68 through its emitter to base 71 circuit and through the primary winding 72 of the transformer 49 thus generating a pulse of voltage to trigger the small silicon controlled rectifier 46 of FIG. 2.

To insure a constant repeatable condition from cycle to cycle the condenser 68 is completely discharged to the potential of the lead B each time the transformer terminal A goes negative by current flow through a diode 75 connected between the condenser 68 and the junction between the condenser 61 and rectifier 62. From this discharged condition at the start of each cycle the condenser 68 is charged at a rapid rate by way of a diode rectifier 76 and resistor 77 from a source of control potential applied across terminals X and B of FIG. 3. The condenser 68 is further charged by current flow through resistors 66 and 67 as soon as the voltage at the junction 65 exceeds the voltage on the condenser 68.

In the circuit of FIG. 1 it may be noted that similar control circuits are employed in each of the three power lines leading to the motor 1. It is desirable that the circuit remain balanced, i.e. each of the silicon controlled rectifiers 14, 15 and 16 be conductive for like intervals of time to minimize any accumulative rectifying action producing direct current in the motor windings. It is therefore highly desirable that each of the timing circuits, such as the one shown in FIG. 3 and which is duplicated in each of the controls 23, 24 and 25, be adjustable for trimming purposes so that they each produce the same timing as the others for a given input condition. Since the critical voltages of the unijunction transistors may vary slightly from unit to unit it is necessary that compensation be provided. This is done in the circuit of FIG. 3 by adding an adjustable resistor 78 to thus adjustably reduce the voltage applied through the rectifier 76 that furnishes the initial charging current for the condenser 68. Thus the magnitude of the initial charge may be adjusted to match the cirtical voltage of the corresponding unijunction transistor. This allows the several timing circuits to be adjusted for precisely equal time delays at the short timing intervals, i.e. when the initial charge thus applied to the condenser 68 supplies nearly enough voltage to trigger the transistor 70.

Circuit adjustment to secure tracking or equality of the timing intervals for the long time intervals is provided by the adjustable resistor 67 which varies the charging current to the condenser 68 and thus adjusts for differences in the Zener diodes 64 and differences in actual capacitance or time constant of the timing circuit comprising the resistors 66, 67 and condenser 68. Thus the adjustable resistor 67 may be considered a low speed or low current trim adjustment. The features of resetting the voltage on the condenser 68 to zero at the start of each timing cycle independently of the unijunction transistor 70, the feature of independent adjustment of the slow rate of charge of the condenser 68 by way of the resistor 67 and the independent adjustment of the potential furnishing the rapid rate of charge by way of the resistor 77 and diode 76 provide an extremely stable, readily adjusted or aligned set of timing circuits capable of precise adjustment, as is required when a plurality of silicon controlled rectifiers used in various phases of a power system must be balanced in operation.

While the circuits of FIGS. 2 and 3 are useful in any situation in which a silicon controlled rectifier is used to control a circuit having an inductive load, it is particularly well suited for control of the voltage applied to an induction motor such as for a speed control under light load duties. For this particular usage, it is desirable in some cases that the voltage control for the motor be speed sensitive, i.e. have speed signal feedback for improving the speed regulation of the motor. It is also desirable that the speed be controllable from the control signals issued by several types of commercial control equipment. Such equipment usually issues a control current ranging from 5 to 15 milliamperes. To satisfy these needs an amplifier circuit such as is shown in FIG. 4 may be employed.

This circuit comprises a three phase half wave rectifier including rectifier diodes 80 connected to terminal A of each of the transformers 26 such as shown in FIG. 3, the rectifier diodes being connected through a resistor 81 to charge a condenser 82 connected between the resistor 81 and return lead B. To regulate the voltage a Zener diode 83 is connected in parallel with the condenser 82 and thus maintains a constant positive voltage on lead 84 with respect to a common return lead B.

The remainder of the circuit of FIG. 4 comprises a comparison circuit for comparing a control voltage with a voltage developed by a speed responsive pickup cooperating with the motor 1 and a three stage transistor amplifier for amplifying the difference in voltage between the control and the speed voltage and supplying an amplified difference signal to terminal X for transmission to the terminals X, FIG. 3 of each of the control circuits.

The control voltage to be compared with the speed voltage is obtained from a resistive circuit comprising a potentiometer 85, a rheostat 86 and a fixed resistor 87 connected in series, in the order named, between the positive supply voltage line 84 and the return line B. The potentiometer 85 has a slider 88 that is connected through a resistor 89 and diode 90 to a junction 91 serving as the output of the control voltage determining portion of the circuit. The junction 91 is also connected through a second diode 92 to the junction between the potentiometer 85 and rheostat 86.

The control voltage may be modified or varied according to an electrical signal applied through leads 93 and 94 connected to the ends of the resistor 89. The electrical signal may be generated by process control equipment that issues a signal indicative of the speed at which the vibrator motor is to operate.

Because of the diode 92 the voltage, with respect to the return lead B, at the junction 91 cannot drop significantly below the voltage at the junction between the potentiometer 85 and rheostat 86. This voltage is adjusted by means of the rheostat 86. The maximum voltage at the junction 91 calling for highest operating speed, occurs when the slider 88 is moved to the high voltage end of the potentiometer 85 because, in the absence of any automatic signal, the voltage at the junction 91 is then fixed by current flow from the wiper 88 through the resistor 89 and diode 90. Intermediate values of control voltage at the junction 91 are obtained by adjustment of the potentiometer 85. On automatic control when a volage is developed across the resistor 89 by the external control signal, the minimum speed is still fixed by the voltage at the junction between the rheostat 86 and potentiometer 85 since the externally applied signal is isolated by the diode 90 in the event the external signal calls for a lower speed. Thus if an increase in the external signal calls for a decrease in speed, the slider 88 is adjusted to the maximum desired speed and the external signal then flowing through the resistor 89 drops the voltage at the junction 91 to effect a decrease in speed. Conversely, if an increase in external signal is required to produce an increase in speed, the slider 88 is set at the minimum desired speed and the automatic signal raises the voltage transmitted through the diode 90 to the junction 91. A high speed limit may be imposed on the automatic signal by adding a diode 95 between the lead 94 and the supply voltage lead 84.

A voltage proportional to speed is used as a feedback voltage in the control system and this voltage may be obtained from any type of tachometer. Preferably, from a practical standpoint, the voltage may be generated in a coil 120 located adjacent the poles of a permanent magnet 121 mounted on the shaft of the motor 1. If such a coil and magnet arrangement is used, the output voltage comprises a positive going pulse and a negative going pulse each occurring for each pair of poles of the magnet. The output voltage of such a coil may be connected through leads 96 and 97 to opposite corners of a diode bridge rectifier 98. A loading resistor 99 may be connected between the leads 96 and 97. A condenser 100 connected across the other diagonal of the rectifier bridge circuit 98 is charged to a potential determined by the peak value of the pulses of voltage obtained from the tachometer generator. As shown, one terminal of the condenser 100 is tied to the return line B and a pair of relatively small condensers 101 and 102 are connected between the leads 96 and 97 and the return lead B to minimize the effect of stray electrical pickup in the leads from the tachometer generator.

This equipment provides a voltage proportional to speed across the condenser 100 and results in a negative voltage applied to a lead 103. This lead is connected through a pair of resistors 104 and 105 and a potentiometer 106 to the control voltage junction point 91. The voltage appearing at a slider 107 of the potentiometer 106 goes positive or negative with respect to the return line B depending upon whether the operating speed of the motor is below or above the desired operating speed.

The voltage at the slider 107, with respect to the return lead B, is amplified by a three stage transistor amplifier comprising transistors 108, 109 and 110. In the amplifier, the principal current path is from the supply lead 84 through an emitter resistor 111 of the transistor 109, the emitter-base path of transistor 109, a resistor 112 connected from the base of transistor 109 to the collector of the transistor 108, through its collector-emitter path, and from its emitter through an emitter resistor or rheostat 113 connected to the return lead B. The current flow through this circuit is determined by the voltage of the slider 107 applied to the base of transistor 108. The current increases when the slider goes positive, which occurs when the control calls for a higher speed than is actually being developed. The increase in current flow through the emitter-base path of transistor 109 produces a correponding increase in current flow through a collector load resistor 114 which raises the voltage on the base of the transistor 110 and thus raises the voltage on the lead X applied to the control circuits of FIG. 3. The rheostat 113 provides an easy method of controlling the voltage gain through the amplifier as may be required to secure stability of operation of the system.

As a safety precaution, diode 115 is connected between the slider 107 and the return line B to limit the application of negative voltage to the base of transistor 108.

In this circuit the potentiometer 106 serves, in part, as a gain or voltage control for the tachometer generator portion of the circuit because it determines how much of the control voltage is matched against the tachometer voltage.

The motor 1 of FIG. 1 may, for example, be used to drive a vibratory conveyor or feeder. Such a feeder is schematically illustrated in FIG. 5. As shown, it comprises a feeder trough 125 that is resiliently supported on a plurality of isolator springs 126, preferably located one at each corner of the trough. Material to be fed by the feeder is supplied from a hopper 127 having a chute 128 that discharges onto the input end of the trough 125. The flow from the chute 128 into the trough 125 depends upon how rapidly the vibratory action of the trough 125 feeds the material away from the lower end of the chute 128. Without any vibration the material remains in the chute 128 and none of the material can then flow from the hopper 127.

The trough 125 is vibrated along an inclined path indicated by the double headed arrow 129 by vibratory forces generated by eccentric weights 130 carried on a shaft 131 of an induction motor 132. The motor 132 is preferably mounted between rubber blocks 133, serving as shear springs connected to struts 134 and 135 connected to and inclined downwardly from the trough 125.

The induction motor 132, as shown in FIGURE 5, is supplied with electrical power by way of a control 136 similar to that shown in FIG. 1.

Figure 6:
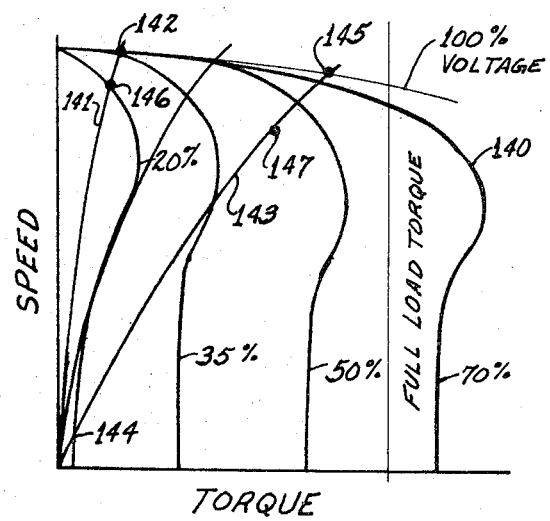
FIG. 6 is a graph relating to the speed-torque characteristics of a non-tuned vibratory system to the speed-torque characteristics of the controlled induction motor.
Figure 7:
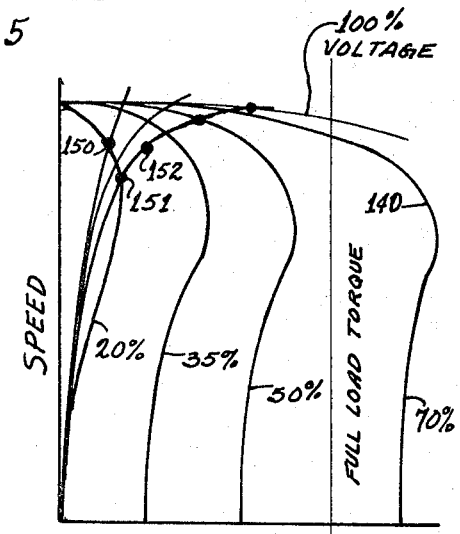
FIG. 7 is a graph relating the speed-torque characteristics of a tuned vibratory system to the speed-torque characteristics of the controlled induction motor.

FIGS. 6 and 7 show the speed-torque curves of an induction motor for various applied voltages, the voltages being measured at the motor terminals. It may be noted that the speed drops only slightly with increase in load up to full load torque when rated voltage is applied. Even at 70% of rated voltage, represented by curve 140 the "breakdown" torque (the maximum torque the motor can develop) is well over the full load torque for the motor. Actually the torque at any given speed is very nearly proportional to the square of the voltage.

The effective torque demand of an untuned vibratory system depends very largely upon the nature of the load on the system. For conveyors and feeders this varies quite widely with the acceleration of the work member of the system, since this determines how much sliding takes place between particles of the load and between the load material and the work member or conveyor trough. At no load very little torque is required to drive the mechanical system, since the motor load then is the friction in the bearings of the motor and the windage of the weights. Thus at no load the torque required may be represented by a line 141. Since the motor operates at the speed where the motor torque equals the load torque, the motor operates at or very near a speed represented by point 142 for voltages down to 35% or so of normal voltage and the majority of the speed range is covered by applied voltages that are less than 20% of rated voltage.

If there is a full load on the feeder the torque requirements may be indicated by a curve 143 that intersects the 20% voltage curve at point 144 representing a speed of 15 to 20% of normal. At normal voltage the speed rises to a value indicated by a point 145.

Another curve 146 represents approximately half load operating conditions.

Since the conveying speed is, over the range of interest, generally proportional to the acceleration (the stroke of an untuned system is substantially constant), it follows that for constant conveying speed under varying load conditions, the power to the motor must be varied with the load to maintain a selected speed. At the high speed, i.e.

full voltage, the motor automatically adjusts its current draw and little speed variation occurs as the load varies. However at low speeds this is not true. For example, the system may have been adjusted to operate at 80% speed, no load as represented by point 146. If full load were then applied without change of voltage the operating speed would drop to that represented by point 144.

The control, according to the invention, automatically takes care of the change in load by responding to the speed change and correspondingly increasing the power to the motor, as explained above. In the particular example the control would increase the power to near 45% of normal full load power so the motor would operate at a speed represented by point 147.

The speed control is not so important if the eccentric weight motor is driving a resonant vibratory system tuned to a frequency slightly higher than the maximum motor speed. In this case the system is operating on a steep part of the resonance curve and a small change in speed produces a large change in the amplitude of vibration. If the motor is operated full speed and low slip, the speed canges very little with load.

Furthermore, the speed change required to reduce the feed rate or conveying rate of a tuned feeder to zero is quite small because of the large change in resonance magnification with speed change. Therefore, it is unnecessary to provide motor speed control over the full speed range. Actually, if rubber shear springs are used as the coupling springs in the tuned system, the internal damping of the rubber provides enough loss so that the total torque load on the motor does not vary too widely from no load to full load on the feeder, i.e., the average external load on the feeder may be only half the total load. In this case enough control may be exercised without the motor speed signal to meet some commercial requirements. However, for best performance it is still necessary to use the motor speed signal to maintain a constant motor speed at the selected value.

If steel coil springs are used as coupling springs the internal losses in the vibratory system are much lower so that changes in work load cause much larger effective changes in the total load. In this case it is, for practical purposes, necessary to include the speed signal from the pickup on the motor to secure adequate control of the vibratory system in the presence of changes in loading on the feeder or conveyor.

The foregoing description is intended to describe the invention but not impose limitations on its scope.

Having described the invention, I claim:

1. A vibratory apparatus that includes at least a vibration generator comprising, in combination, an induction motor, eccentric weights driven by the motor, means for connecting the motor to a source of alternating current electrical power, said means including high speed switching means for variably controlling the voltage only of the electrical power flow to the motor, means for continuously measuring the motor speed, and means for comparing the motor speed with a control signal and controlling said high speed switching means to maintain the motor speed at a value corresponding to said control signal.

2. A vibratory apparatus according to claim 1 that comprises a work member mounted for vibratory motion along at least one direction, and means rigidly attaching the motor of said vibration generator to said work member, to induce vibration along said one direction.

3. A vibratory apparatus according to claim 1 that comprises a work member mounted for vibratory motion along at least one direction, and resilient means coupling the motor of said vibration generator to said work member, said work member and said motor cooperating with said resilient means to form a vibratory system having a natural frequency slightly higher than the maximum speed of the motor, said motor speed being controllably adjustable to controllably vary the vibratory response of the system to the force of the eccentric weights.

4. A vibratory apparatus according to claim 1 in which the high speed switching means includes silicon controlled rectifiers arranged to control the application of power to the motor.

5. A vibratory apparatus according to claim 1 in which the means for measuring the speed of the motor includes a permanent magnet mounted on the motor shaft, and a coil mounted adjacent the path of the magnet, whereby a voltage is generated in the coil according to the speed at which the magnet passes the coil.

6. A vibratory apparatus according to claim 5 in which the permanent magnet has a plurality of poles, whereby a plurality of voltage pulses are generated in the coil for each revolution of the motor.

References Cited

UNITED STATES PATENTS

| 3,251,457 | 5/1966 | Dumbaugh | 198—220 |
| 3,320,506 | 5/1967 | Humphrey | 318—227 |

RICHARD E. AEGERTER, *Primary Examiner.*

U.S. Cl. X.R.

318—227